(12) United States Patent
Mitola, III

(10) Patent No.: US 9,325,468 B2
(45) Date of Patent: Apr. 26, 2016

(54) RADIO RESOURCE MANAGMENT

(71) Applicant: Federated Wireless, Inc., Boston, MA (US)

(72) Inventor: Joseph Mitola, III, Cocoa Beach, FL (US)

(73) Assignee: FEDERATED WIRELESS, INC., Boston, MA (US)

( * ) Notice: Subject to any disclaimer, the term of this patent is extended or adjusted under 35 U.S.C. 154(b) by 514 days.

(21) Appl. No.: 13/826,373

(22) Filed: Mar. 14, 2013

(65) Prior Publication Data

US 2014/0269526 A1 Sep. 18, 2014

(51) Int. Cl.
*H04L 5/20* (2006.01)
*H04L 5/00* (2006.01)
*H04W 72/12* (2009.01)
*H04W 16/14* (2009.01)
*H04M 15/00* (2006.01)

(52) U.S. Cl.
CPC ............. *H04L 5/0037* (2013.01); *H04W 72/12* (2013.01); *H04M 15/805* (2013.01); *H04W 16/14* (2013.01)

(58) Field of Classification Search
CPC .................................................... H04L 5/0037
USPC ......................................................... 370/200
See application file for complete search history.

(56) References Cited

U.S. PATENT DOCUMENTS

| | | |
|---|---|---|
| 2002/0186167 A1 | 12/2002 | Anderson |
| 2011/0149925 A1* | 6/2011 | Olsson et al. .................. 370/337 |
| 2012/0122463 A1* | 5/2012 | Chen et al. ..................... 455/450 |
| 2013/0021929 A1* | 1/2013 | Kim ............................... 370/252 |
| 2014/0094199 A1* | 4/2014 | Palanki et al. ............. 455/456.5 |

OTHER PUBLICATIONS

International Search Report and Written Opinion Issued by the European Patent Office as International Searching Authority for International Application No. PCT/US2014/24030 mailed Jul. 3, 2014 (9 pgs.).
Mitola, Joseph, III, "Cognitive Radio, An Integrated Agent Architecture for Software Defined Radio," TRITA-IT. AVH, Stockholm, May 8, 2000 (313 pgs.).
Fette, Bruce, "Cognitive Radio Technology," Excerpt, Elsevier, XP040426135 (2006) (649 pgs.).

* cited by examiner

*Primary Examiner* — Wei Zhao
(74) *Attorney, Agent, or Firm* — Finnegan, Henderson, Farabow, Garrett & Dunner, LLP

(57) ABSTRACT

Methods and systems described herein relate to more optimally allocating and scheduling radio resources simultaneously in space, time and frequency to enhance user quality of experience (QoE) according to use context within the constraints of maximizing long term service provider revenue expectation for a given investment in radio access network infrastructure for improved radio resource management, such methods optionally including use of heat maps of user trajectories as a factor in a process for resource allocation.

18 Claims, 6 Drawing Sheets

RADIO RESOURCE MANAGMENT

BACKGROUND

1. Field

The present invention is related to wireless communications systems.

2. Description of the Related Art

Conventional networks manage radio resources according to criteria established by the network. This may include a fixed allocation strategy or a dynamic allocation strategy. A core radio resource management (RRM) element of a commercial wireless network such as a Long Term Evolution (LTE) network may include a scheduler. Such a scheduler may generate a schedule for radio resources at a given wireless network infrastructure base station (e.g. in LTE, an evolved Node B or eNB), based on a multiplicity of parameters reflecting allocation criteria. Parameters input to such a scheduler may include Backlog[1 . . . Nue], QoS[1 . . . Nue], CQI[1 . . . Nue], Nue, UEMode[1 . . . Nue], Nprb, PRB[1 . . . Nprb][1 . . . Nsfr], ANT[1 . . . Na], and UEant[1 . . . Nue].

The Backlog[1 . . . Nue] may include the amount of data backlogged to each of hundreds of user equipment (UE) being serviced by such an eNB. The quality of service (QoS), if any, may include the QoS requirement parameters assigned to each such UE such as minimum bit rate and whether the traffic needs guaranteed bit rate (GBR) or not. The channel quality indication (CQI) may include the CQI of each such UE. Nue may include the number of UE currently known to the eNB. The UEMode may include the mode of each UE and may be expressed as a binary matrix indicating whether UE is in idle or connected mode. The Nprb may include the number of physical (radio) resource blocks (PRBs) available to the eNB. The PRB[1 . . . Nprb][1 . . . Nsfr] may represent the instantaneous usage of PRB in the scheduled LTE frames and subframes among Nsfr subframes being scheduled. The ANT[1 . . . Na] may represent the eNB antenna capabilities, indicating degree of multiple input multiple output (MIMO) available in each of Na cells and elements. The UEant[1 . . . Nue] may represent the antenna capabilities indicating MIMO degree per user antenna for uplink and downlink. Examples of uplink-specific parameters may include uplink channel conditions estimated by the eNB, noted as ULCQI(1 . . . Nue). Examples of uplink buffer status reports from UEs, noted as UBacklog [1 . . . Nue] may include the amount of data backlogged for uplink in each UE of such an eNB.

A network's criteria expressed in these parameters is combinatorially explosive and thus may not be possible to optimize within each frame, subframe or slot. Additionally, the schedule and its consequences may not reflect the value that a user would place on the opportunity to communicate. The network's criteria may reflect the complexity of managing the radio resources, such as traffic capacities (e.g. data rate), time delay, timing jitter, connection reliability, CQI, and other parameters known in the art as quality of service (QoS). When network capacities are exceeded, criteria for allocating radio resources may not reflect the tradeoffs a user might make regarding specific radio resources. Thus although the eNB includes parameters for Backlog and QoS in its allocation decisions, such an eNB may not have a parameter expressing user's current quality of experience (QoE). For example, such conventional scheduling does not consider whether a user is browsing a map for a future trip, or if the user is using the map to decide whether to exit the Interstate highway in 1 mile when traveling at 70 mph. The eNB has the basic service requests (BSR) of each eNB, but not the use context. There may be little or no dialog between a network and a given mobile node or collection of such nodes to express such context-sensitive degree of need for a given radio resource.

Methods for network-based radio resource allocation include the water filling algorithm and the Frank Kelly algorithm. The water filling algorithm applies available resources to the user (e.g. mobile node) most in need if resources are available when the node requests them. The Frank Kelly algorithm finds a data rate per user that is optimal with respect to a decision parameter which is the product of the utilities of the individual users. For the mathematics of the Frank Kelly algorithm to yield an optimum, users' needs must be elastic. That is, the utility function of user j on node j must be continuous, e.g. such as expressed in a number between 0 and 1.0. The value that a user may place on communication via a smart phone may not be elastic. In addition, the Frank Kelly algorithm may place significant traffic into the network for its iterative value estimate to converge to a set of utilities per user, $U_j$ for $1 \leq j \leq N$, for N users, each of which may employ a mobile node.

An improved Frank Kelly algorithm may distribute decision making and may improve utility metrics. However, the water filling and Frank Kelly algorithms do not reflect the differences in value of network access among different applications. Such different applications may have different requirements for guarantee of bit rate, different likelihood of maintaining and/or losing connection, and with smaller or larger physical extent (e.g. the difference between a Wi-Fi network, which may have an extent of 30 meters, and a cellular network, which may have an extent of 2 kilometers). Improved Frank Kelly and water filling algorithms do not reflect differences in the value that a user may ascribe to a specific application or class of application at a point in space and time that may be different from that in another point in space and time.

These systems, methods, objects, features, and advantages of the present invention will be apparent to those skilled in the art from the following detailed description of the preferred embodiment and the drawings. All documents mentioned herein are hereby incorporated in their entirety by reference.

SUMMARY

Provided herein are methods and systems for allocating and scheduling radio resources simultaneously in space, time, and frequency according to a per-user use context (UCX) to maximize aggregate user quality of experience (QoE) within the constraints of maximizing aggregate service provider revenue expectation with respect to radio access and core network infrastructure, and which may provide improved radio resource management (IRRM). Associated with an IRRM apparatus may be network and device self-awareness, user-awareness, and behavior forensics methods that may generate parameters optimizing RRM at a given node and with respect to a larger radio network and enterprise, such as the enterprise of a wireless network operator or more fully optimized for a quad play (i.e. wireless, voice, video, Internet) service provider.

Advantages of the methods and systems herein may include, without limitation, greater network throughput; greater clarity of likely return on investment for investment in wireless and core network infrastructure; greater clarity of likely return on influence for customer loyalty; improved average QoE per user; improved QoE above the average for significant clients such as corporate clients of a service provider; greater average retention of commercial users and corporate clients via enhanced loyalty; and improved public service in local, regional, and national emergencies. An example of greater clarity of likely return on investment for investment in wireless infrastructure may be a service provider's return for interoperability with consumer devices, such as TV white space, and shared spectrum devices (e.g. the FCC's proposed 3550 MHz Citizen's Broadband Service). An example of improved public service may be improved E911 service to first responders, leveraging of FirstNet in the US.

In embodiments, the system for allocating and scheduling radio resources simultaneously, based on a user context may comprise a radio resource control point facility associated with a network, enabled to track the location of a user device that is connected with the network, track the content of transmissions via the network to and from the user device, mediate a bidding process for a requested resource based on a bid from the user device, generate a heat map of trajectories for the network, and based on the bidding and the heat map, schedule network resources including radio resources.

BRIEF DESCRIPTION OF THE FIGURES

In the drawings, which are not necessarily drawn to scale, like numerals may describe substantially similar components throughout the several views. Like numerals having different letter suffixes may represent different instances of substantially similar components. The drawings illustrate generally, by way of example, but not by way of limitation, a detailed description of certain embodiments discussed in the present document.

DETAILED DESCRIPTION OF THE PREFERRED EMBODIMENTS

Figure 1:
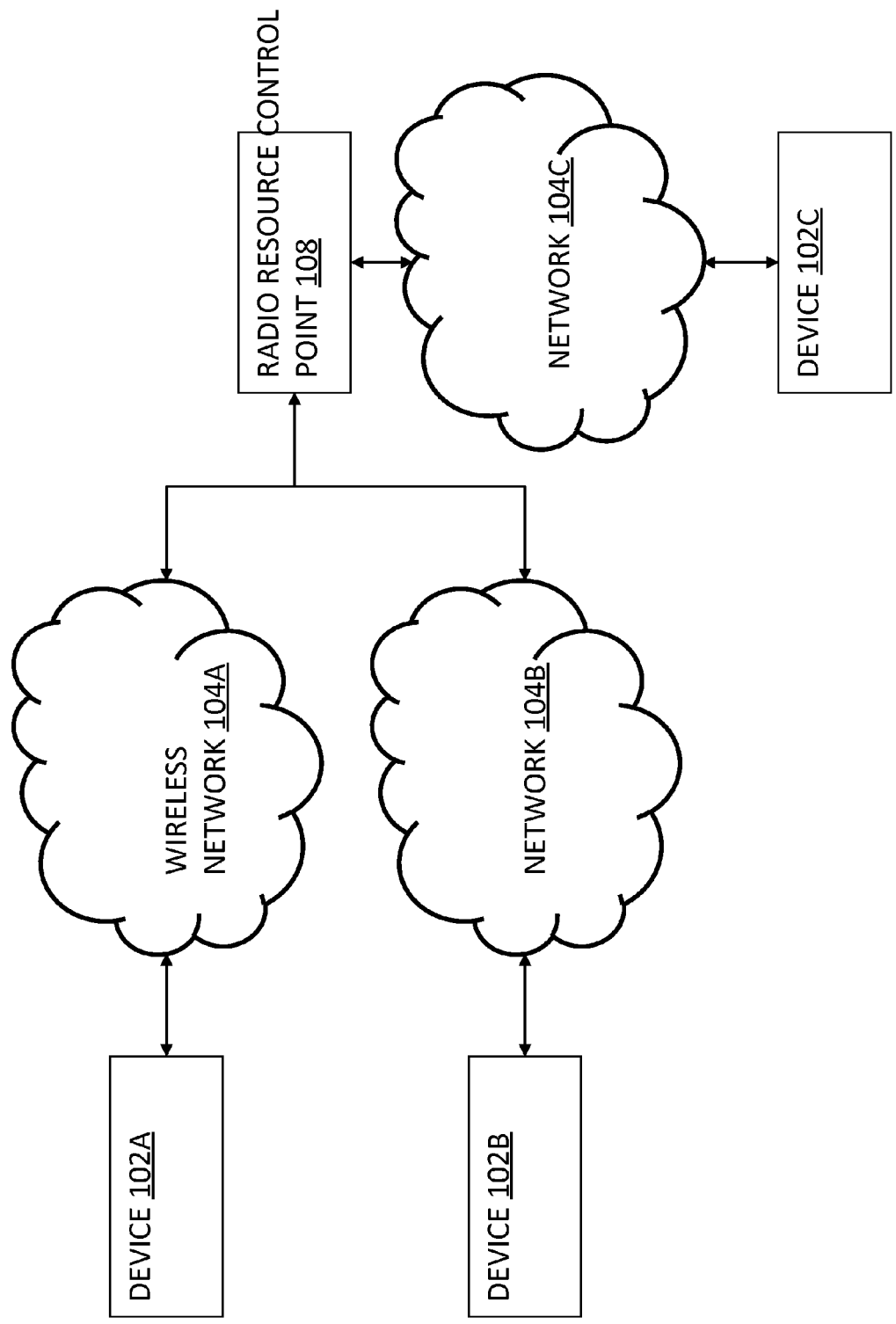
FIG. 1 depicts methods and systems for managing resources on a network.

There is a growing demand for bandwidth to send data to and from mobile devices, but, in many places, the bandwidth for such devices is limited. For example, in the U.S., the FCC has made only certain portions of wireless spectrum available to carriers. Since there is a limited supply of bandwidth and a growing demand for such supply, there exists a need to more effectively allocate and schedule bandwidth and related radio resources for wireless networks. The current art does not incorporate measurements of user QoE for radio resource allocation and scheduling.

Provided herein are methods and systems for allocating and scheduling resources simultaneously in space, time, and frequency according to a per-user usage context (UCX) to maximize aggregate user QoE. QoE may derive from the quantity, quality, timeliness and suitability (QQTS) of information provided to a user with respect to the expectations of the specific user in a given time, place, and UCX.

As noted above, allocation of radio resources to UE based on conventional parameters may not reflect user expectations. Machine learning of user behavior patterns may characterize user expectations in terms of statistical patterns. For example, such patterns may be recorded and depicted as a heat map, which may express user tendencies.

Qualitative heuristics may enhance the quality of user behavior modeling with respect to user expectations. Quantitative statistics, including but not limited to Bayesian inference, may be employed to optimize RRM with respect to a most likely user value assignment within constraints of network parameters. The qualitative heuristics may be expressed as correlation and weighting rules.

Improved parameters may also quantify user expectations via user behaviors termed trajectories. For example, improved parameters may quantify core and extended radio resources in terms of availability to and controllability by a core network. Such radio resources may include, for example, controllable and opportunistic radio resources. Controllable radio resources may include core wireless infrastructure bands and modes (e.g. 1XRTT, LTEr9), existing bands-modes (e.g. LTEr8), and emerging bands-modes such as LTEr10, and LTE Advanced with carrier aggregation (CA), cooperative multipoint (CoMP), the advanced wireless system (AWS) (e.g. with 1.7 GHz uplink and 2.1 GHz downlink), and band-mode combinations that may be defined in such improved parameter tables herein. Opportunistic modes may include bands and modes that may be available in the hardware of a UE, such as, but not limited to Bluetooth, Wi-Fi, ZigBee, WiMax, Citizens Broadband Service, and TV whitespace RF bands. Such opportunistic bands and modes may connect to radio access points connecting to the Internet. There may be shared-spectrum opportunities, e.g. for small cells that may not be directly controlled or completely controllable by a network or networks employing one or more radio resource control point facilities.

The value of alternative UE space-time-frequency trajectories may be quantified via per-application shadow pricing in a non-linear bidding process. Since not all UEs may enable shadow pricing, a radio resource control point facility may attribute shadow prices and may use context QQTS based on, for example, Bayesian inference that may maximize user QoE, e.g. of a quad-play user. The benefits of quantification of user expectations for QQTS, shadow pricing per-application per-user, and resulting Bayesian resource allocation may enhance QoE for enhanced user loyalty to a quad play service provider.

Machine learning and autonomic user behavior analytics of IRRM may characterize cellular infrastructure coverage and coverage gaps with respect to user expectations of QQTS in a given UCX to quantify immediate and expected return on investment for alternate forms of infrastructure such as macro cell towers, small cells, and more capable UE. Such QQTS may be defined by IRRM with respect to a mix of capabilities of UE in a service provider's subscriber base. IRRM may apply to UE and to radio access points (e.g. an LTE eNode B, a WiFi or Whitespace device) in a radio access network, to a cellular telephone system, to a mobile ad hoc network or to an Internet of Things (IoT). Additionally, IRRM may apply to other wireless networks such as, for example, first responder networks, according to QQTS parameters for integrated user-network value-optimization across an aggregate UCX for network operation. IRRM applied to such networks results in improved human value according to QQTS per UCX as measured by IRRM.

Referring to FIG. 1, methods and systems for allocating and scheduling radio resources simultaneously, based on a user context, quantified as a UCX metric, UCX j for user j, may comprise a radio resource control point facility 108 associated with a wireless network 104A, and enabled to track the location of a user device 102A that is connected with the wireless network 104A. Such a control point 108 may track the content of transmissions via the alternative wired and wireless network connections 104A, B, and C to and from the user device 102A. Such a control point 108 may mediate a bidding process, yielding a device-ascribed value for a requested resource based on a bid from the user device 102A. Such a control point 108 may generate a heat map of user device 102A, of radio and network resource trajectories for the network 104 via access methods 104A, B, and C, and based on a device-ascribed value, a heat map, and a network-ascribed value may schedule network resources. A user device 102 (for example device 102 A, B, or C) may be a mobile device, such as a smartphone, a laptop, a tablet or some other mobile device. A user device 102A may connect to a network 104A via a wireless connection. The wireless connection may be mediated, for example, by a wireless node such as a cellular tower, a Wi-Fi hotspot, a TV White Space device, an LTE small cell, a wireless router, or some other wireless node. In embodiments, the user device 102A may connect to the wireless node via a radio frequency (RF) exchange of information. In embodiments, the network 104 may include a wireless network 104A, and may include wired network resources such as the Internet, an intranet, a personal area network, a virtual private network (VPN), a local area network, a wide area network, a metropolitan area network, or some other network. The user device 102A may communicate with the network via Wi-Fi, Bluetooth, cellular data, radio communication, near field communication or some other communication method exchanging messages such as control messages, SMS messages, Internet Protocol (IP) packets, etc.

In embodiments, the radio resource control point facility 108 may comprise a computing device, such as an application-specific integrated circuit (ASIC), a field programmable gate array (FPGA), a server, a router, a wireless router, a switch, a gateway, a border controller, a hub or some other computing device. In embodiments, the radio resource control point facility 108 may be enabled to track a plurality of user devices 102A-C. In embodiments, the radio resource control point facility 108 may be associated with a plurality of networks 104A-C.

In embodiments, tracking the location of a user device 102A by the radio resource control point facility 108 may include tracking the location of the user device 102A based on the network resource to which the user device 102A is connected (e.g. based on the location of the wireless router to which the user device 102A is connected). In some embodiments, tracking the location of the user device 102A by radio location of the device, such as by combining measurements of received signal strength indication (RSSI), direction of arrival, phase of RF signals, time difference of arrival (TDOA), (e.g. based on a multiplicity of radio access points within range of the user device 102A) or any other radio location method. A user may be located by the network based on interaction with devices other than a user device 102A, such as via a home security system in which a user may have entered a code of a home security system operated by a network service provider having a radio resource control point facility 108. A user may be located by interaction with computationally intelligent networked devices termed in the art the Internet of Things (IoT), or by some other means. User location may be indicated via such a network to a radio resource control point facility 108, e.g. for use in generating a user heat map.

In embodiments, tracking the content of transmissions via the network 104 and from the user device 102A may comprise an apparatus inspecting packets to extract content type for use by such a radio resource control point facility 108. In embodiments, the radio resource control point facility 108 may inspect packets using one or more of a monitoring port, a network tap, TUN/TAP or some other software or hardware apparatus termed in the art a packet sniffer (e.g. Colasoft Capsa, Carnivore, Narus' NarusInsight, Microsoft Network Monitor, ngrep, tcpdump, etc.). The content of a transmission may include services known in the art as multimedia services. Such multimedia services may include voice, video, text messaging (including attachments such as images, voice or video clips), and Internet access (such as web services, gaming, corporate activities, software updates, and other applications). Voice multimedia services may include a call, for example, between user device 102A and user device 102B; a conference call between user device 102A, user device 102B and user device 102C; or some other audio media service. Video multimedia services may include pre-recorded video (e.g. streamed from YouTube), broadcast video (e.g. a live video stream from a sporting event), multipoint video (e.g. video conference using, for example, WebEx), and peer video (e.g. video chat between user device 102A and user device 102C).

In embodiments, tracking the content of transmissions via the network 104 and from the user device 102A may further comprise designating, by the radio resource control point facility 108, a type to a multimedia service. For example, a parameter $MMS_j$ may designate multimedia service j from a set MMS, where MMS={voice, conference call, video pre-recorded, broadcast video, multipoint video, peer to peer video, text messaging, text messaging with images, text messaging voice clip, text messaging with video clip, Internet access web services, Internet gaming, Internet corporate activities, Internet software updates, Internet application a, Internet application b}. A MMS connection with a user device 102A may result in the distribution to a radio resource control point facility 108 of the MMS type and related service parameters of such a connection. A network may identify its authorized users by a user number u. Such a network may track access by user u to a service $MMS_j$ at a start time t-start and at a location (x, y, z) via a radio frequency resource f. In embodiments, a user-location error likelihood may be estimated, e.g. as an uncertainty or covariance c. Such a tracking event may result in an element of information e=(u, t-start, x, y, z, c, f, $MMS_j$) that may be an element of IRRM data of such a network. Additionally, in embodiments, such an element, e, may be used for other purposes, such as in generating an invoice or bill for services.

In embodiments, a further element of IRRM data may comprise a mode of mobility of a mobile user, u. The mode of mobility of a mobile user may be annotated within an element of information e via a symbolic annotation of user number u with a mobility code. In embodiments, a set of mobility indicators, M={i, f, a, d, t, b, w}. Such indicators for such a user u may indicate the mobility method of users. For example, the mode of mobility may be noted as u-[x], where [x] represents the mode of mobility. In this example, a user that may be known or inferred by such a multimedia network to be temporarily immobile e.g. because the user is known or inferred to be in bed at night, in a hospital bed, etc.) may be noted as u-i, meaning "user#u is immobile." If sitting while having lunch mode f for fixed may be ascribed, Thus, in the example, a user number 001 may be known to the network by an information element e=(001-i, 0, 0, 0, 0, 100, 2400, voice), where user number 001 is temporarily immobile at time t-start=0, at an origin location (0,0,0) with a location uncertainty of 100 meters using a radio frequency RF of f=2400 for the multimedia service "voice." In embodiments, other mobility modes may exists. Such alternative mobility modes may include, but not be limited to on foot (e.g. noted as u-f) and by an automobile a (e.g. noted as u-a). Additionally, the network may know or infer other mobility modes, such as, but not limited to the user is likely driving (e.g. such as driving an automobile a, which may be annotated in e as u-d), user is riding a taxi (e.g. noted as u-t), user is riding public transportation (e.g. noted as u-b for bus or as u-s for subway), user is riding a boat (e.g. noted as u-b for a boat such as a tour boat), user is riding a personal water craft (e.g. noted as u-w), user is riding a commercial jet aircraft (e.g. noted as u-j), and other such combinations as may be conveniently known or knowable to a multimedia services network regarding services provided to a known mobile user u.

As noted above, in embodiments, there may be a plurality of user devices 102A-C. One user may carry and use more than one such user devices 102A-C at a given time. Alternatively, such user devices 102A-C may be used by a plurality of users. A second user u2 may obtain multimedia services via a second network 104B via a wireline connection. In embodiments, access by such second user u2 to a service MMSj at a time t-start and at a location (x, y, z) with location error covariance c, via a wireline resource w also may result in an element of information e=(u, t-start, x, y, z, c, w, MMSj). Such an element of information e also may be employed by a second wireline network 104B, e.g. in generating an invoice or bill for services. The second user's wireline connection 104B may imply a lack of mobility (i.e. because the user is connected at specific and immobile location) and such lack of mobility may be indicated in the element of information e via a notation c indicative, e.g., of cable access. As noted above, a set of mobility notations may include a set c: M={i, f, a, d, t, p, b, w, j, c}, where i may represent an immobile user, such as the second user connected to the second network 104B via a wireline connection.

In embodiments, a user may disconnect a device 102A from a network 104A. For example, the user associated with device 102A may power off device 102A and, therefore, disconnect the device 102A from network 104A at a given time t. The network 104A may ascertain at a time t and at location (x, y, z) with location error covariance c, whether a given user u associated with device 102A may be connected to multimedia services. The user u ending a wireless connection 104A or wireline network connection 104B may be known to such a network by an ending time tend. A user whose mobility mode M is not known may be indicated by a mobility mode u (e.g. for unknown) or may not be annotated, as may be convenient for forming and using an element of information e.

In embodiments, the location (x, y, z) of a user u may refer to a physical location, a symbolic location, a set of locations, or some other location information. A physical location may be a represented by GPS coordinates (e.g. decimal numbers, like (44.121, 22.101, 6.4) for a GPS latitude, longitude, and height above mean sea level). In embodiments, the location of a user u may refer to a set of locations. For example, a location of a user u may refer to a locus of locations passing through a highway tunnel, which may be represented by (x, y, z, c), e.g. with an endpoint location (x, y, z). In embodiments, a symbolic location may be represented by integers or other characters, for example, instead of decimals. For example, an unknown location may be represented by "(0, 0, 0)," "U" or some other some other representation. A symbolic location may also indicate out of service area, for example, symbolically "O" and numerically (9,9,9). In embodiments, the location (x, y, z) may include an uncertainty such as a location error covariance. For example, a location error covariance of 44.1 may represent an estimated 90% probability that a user u may be within 44.1 meters of a GPS location (x, y, z, c)= (44.121, 22.101, 6.4. 44.1). In embodiments, other statuses may be represented. For example, integers (x, y, z) and associated symbols may represent user status as deceased, having cancelled service, whose prepaid service card may have expired, and the like.

In embodiments, a set of locations, whether symbolic or physical, may be encapsulated as a trajectory T={(x1, y1, z1, c1), (x2, y2, z2, c2), . . . (xNT, yNT, zNT, cNT)}. Such a trajectory may be named with respect to a convenient physical reference. For example, a trajectory for a segment of US Interstate route 95 passing through Duvall County, Jacksonville, Fla. may be named "I95-JAX." In embodiments, user-specific trajectories may be named. For example, user-specific trajectories may be named by a function as may be conveniently referred to by a user, such as "Go to work," which may be more compactly noted as a symbol W, and may associated with a user number u. For example, user u's "Go to work" trajectory may be referred to as u-W and may represent the inbound half of a daily commuting path expressed as named trajectory T for u. In embodiments, a plurality of trajectories Tk may be combined into a combined trajectory TM that may include one or more Markov Models, known in the art to be statistical expressions of the likelihood of a choice between one or more alternatives. For example, a physical trajectory Ta of a user u may have been noted by the network 104A for a first user of a first device 102A as Ta={(xa1, ya1, za1, ca1), (xa2, ya2, za2, ca2), (xaNT, yaNT, zaNT, caNT)}, which may enumerate the points along a trip to work W. In another example, a trajectory Tb of user u may be Tb={(xa1, ya1, za1, ca1), (xb2, yb2, zb2, cb2), (xbNT, ybNT, zbNT, cbNT)}. In the first example, a compact notation for a point (xa1, ya1, za1, ca1) may be a point a1 of trajectory Ta. In the given examples, a1 may be the origin of trajectories Ta and Tb, and, therefore, these two trajectories may overlap. In these examples, since the second points, i.e. a2 of Ta and b2 of Tb, are not the same, the trajectory may indicate that a user u may have taken two different paths for the two trajectories. In these examples, a1 may be user u's home, Ta may be the path from u's home to u's office, as noted above, and Tb may represent a trip to drop off a child at school.

In embodiments, a Hidden Markov Model (HMM) may express the probability of user movement down one or more such trajectories, Ta, Tb, etc. In embodiments, methods for inducing such a HMM may include counting the number of times that a user's device 102A reports to a network 104A a location on such a trajectory. For example, suppose the count for Ta is 10, the count for Tb is 80 and the count for Tx is 10. In this example, 100 events have been counted. The likelihood of a future behavior may be expressed according to the relative frequency occurrence of previous behavior. The relative frequency of occurrence of Ta in this example has been 10/100=10%. The relative frequency of occurrence of Tb has been 80/100=80%. The relative frequency of occurrence of Tx has been 10/100=10%. In embodiments, such historical patterns may be used, for example, by a radio resource control point 108, to predict future behavior so that radio resources based on the relative frequency of the previous behaviors to provision the resources for user u in advance. Using such historical patterns to provision resources may permit the radio resource control point facility 108 to provision such resources so that the resources may be employed by user u on a trajectory, e.g. Tb, without delay and may improve the throughput of the network 104A with respect to the device 102A of a group of such devices.

In embodiments, a user u may ascribe value to MMSj between a start time t-start and an ending time t-end. In embodiments, the user may differentiate values between trajectories. In embodiments, the network may be able to ascertain that the user u ascribes some monetary value to MMSj based on the amount the user u pays for user u's subscription (e.g. for the user u's monthly data plan). However, a user u may make a payment Pu for services MMSu={MMSu1, MMSu2, MMSuN}u, for a time interval Tu. During Tu, the user u may have a plurality of trajectories, among which a given MMSj is one of many services experienced. Additionally, MMSj may have a greater or lesser value as a function of time, trajectory and other factors of a parameter UCX that may not be knowable to the network such as time between usages of a particular game or other smart phone application. The user u may not ascribe equal value to all such services MMS. However, the network may ascribe a value to such services, such as V=Pu/(ΣVMMSTu) where Pu may be a payment for MMS during an interval Tu and ΣVMMSTu may be a sum over an interval Tu forming a metric representing the totality of MMS actually used during time interval Tu where each VMMSj(t-start, t-end) may represent a value of MMSj ascribed for interval (t-start, t-end). Such a metric may be based on a statistical model of users and usage that may include frequency of usage of MMSj, duration of usage as a proportion of duration of an experience of MMSj offered, such as whether a segment is interrupted such as muting a video advertisement or watching a movie through to the end. A multimedia service provider may provide wireless services as a subset MMSuw of a larger set MMSu experienced by a user u as provided by such a network.

In embodiments, business decisions regarding opportunities to build out wireless infrastructure associated with an example wireless network 104A to a level of capability for a specific MMS service MMSj may be informed by a physical-logical-temporal distribution of users including wireless and wireline users employing such a service. For example, users employing both wired and wireless services from a network 104, such as voice telephony via network 104A and Internet access via wireline network 104B to a given application, at a given time and place may ascribe value to such MMS. Such value may be a function of location, time, and other personal circumstances that may be quantified in a UCX parameter including mobility M as well as passive observations of content usage. In conventional radio resource management, users may be provided with MMS based on a simplified one-size-fits-all quality of service (QoS) metric that may depend primarily on an overall class of MMS, such as voice that requires guaranteed bit rate (GBR) versus data (that does not require GBR). However, there may be a multiplicity of types of data access that may enjoy differential value as experienced by user at different times, places, trajectories and other UCX parameters such as, not as a limitation, but as an example, like the weather. In embodiments, a radio resource control facility 108 may enable a multimedia service provider to employ the value that a given user may place on a given MMS at a given time and location or on a given trajectory, whether unique to a given user u, to UCX(u), or common to a subset of mobile wireless users.

Figure 2:
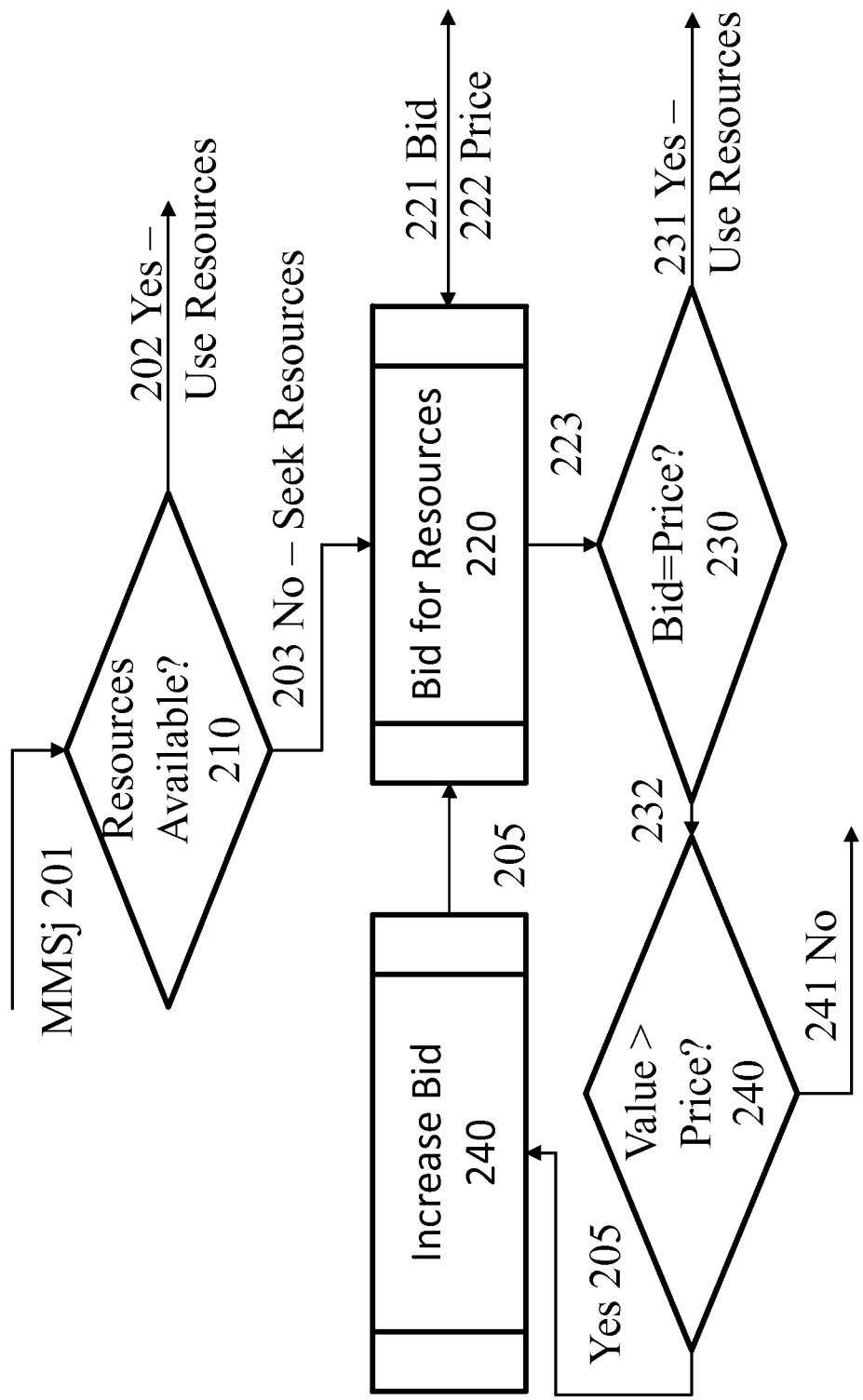
FIG. 2 depicts a workflow for bidding for network resources.

Referring now to FIG. 2, which depicts a logical flow of user bidding process for QQTS requiring radio resources of a user device, UE. A user device, such as a mobile phone, a tablet or a laptop, may be enabled to bid for network resources based on a stimulus. The logical flow may begin by a stimulus 201 such as from a user action, a network action or an internal state change of the device. Upon detecting the stimulus 201, the device may perform a test 210 that may check for the availability of radio resources on the device for some service MMSj at 201. The status of the network's radio resources may become known to the device at decision point 210, such as by checking internal status registers of the device. If resources are available, then such resources may be used, so the flow of control may exit the device at decision point 202 to employ the resources required for MMSj. If resources are not available, then the resources required for MMSj may be acquired by seeking at 203 with an initial step of bidding at 220, e.g. via the transmission of a control message 221 containing a bid via an air interface to a radio resource control facility 108. Such radio resource control facility may control a radio access point (RAP). The radio resource control facility may return a price for the radio resources, $RR, at 222, termed a shadow price as an expression of value that may not be strictly monetary in its usage. The device may determine at 230 that the shadow price bid, $bid, by the device equals the asking price at 222, establishing that the wireless network has agreed to provide the resources required for MMSj for user u at time t-bid at location L-bid or on trajectory T-bid. Such a decision 230 may cause the logical flow of control to exit to use the newly provided radio resources. A failure at 230 may cause flow of control to test at 230 whether the value ascribed by the user may exceed the shadow price 222 expressed by the network, e.g. via air interface. If the value exceeds price at 205, then a device may increase its shadow price at 205 resulting in a new bid at 221. If value is less than price, then flow of control may exit with an insufficiency of radio resources for MMSj.

In embodiments, a user may bid for QQTS of an MMSj. Such a bid may be provided by the user explicitly, implicitly, both, or neither. If the user does not provide the initial bid, an initial bid $MMSj at 221 may be defined a priori. The user of a multimedia services network may express the user's degree of interest and personal priorities, e.g. to a sales force at a retail store. Such a sales force may ascribe an a priori value for user u to a service MMSj of a user u's set of services MMSu={MMS1u, MMS2u, . . . MMSNsu}. A user may express preferences via interaction with a multimedia services network, such as via participating in a survey or via interaction with a Help Desk, etc. A user may further express preferences via a process of bidding for a specific multimedia service MMSj at a specific time t-bid and location L-bid=(x-bid, y-bid, z-bid, c-bid) that may be a physical or logical place and that may be known to a multimedia services network as a point p on a trajectory T of a user u, Tu[p]. In embodiments, the user may express a bid for QQTS of a service MMSj at time t-bid and location L-bid by offering to pay extra funds (e.g. pay per view) or by taking extra time (e.g. responding yes to a request to participate in a survey), or otherwise to pay such a MMS network in funds or in kind for such services. A service provider may express a price $(MMSj,t-bid) that may be paid and that may be ascribed as an explicit bid for MMSj that may endure until MMSj has been delivered to user u. The service provider's price may be expressed, for example, as monthly invoice or credit card payment. When one or more users bid for an MMSj the MMSj may be elevated to a status of a premium service in terms of QoS parameters for RRM.

In a preferred embodiment, a multimedia services network may determine that a mobile user is connected to a point in the multimedia network. In embodiments, the network may determine the point at which the user's device is connected to the network based on an IP address. For example, the network may determine the user's device is connected to an IP address that may provide browsing for premium services. A user may have a pattern known to the network as an abstract trajectory T-premium by which a HMM may be induced that may ascribe a prior probability P(MMSj) to the act of the user purchasing MMSj at time t-bid at location L-bid in trajectory T-bid. Such a multimedia network then may ascribe a bid price of $(MMSj,t-bid)*P(MMSj) reflecting the product of the prices offered for such services and the probability that this specific user, u, would purchase this specific service. An improved radio resource manager, such as a radio resource control facility 108, may incorporate such a price into its allocation and scheduling of radio resources during a time interval during which a user may be browsing MMSj. Thus, a bid for a given MMSj may be explicit as with the purchase of a premium service or may be implicit as with taking time for a survey or browsing for a premium service as illustrative but not constraining examples.

In embodiments, at a particular time, place, and RAP, there may be a multiplicity of users that may have expressed a bid by purchasing premium services. In such embodiments, other users may not have expressed a bid. A multimedia services network may designate its RAPs as RAP-A, RAP B, etc. The users enjoying premium status at RAP B may include a set Premium(B)={u1, u2, ... uPB}. RAP B may have insufficient resources to provide premium services to all of the users uPB at a given point in time, employing its currently controlled and opportunistic radio resources via the current schedule of intended usage. The current schedule of intended usage may identify the next scheduling time epoch, which may include a hierarchy of time epochs with a detailed schedule for the current and next air interface frames of mobile users at RAP B. Such schedule may also include more or less detail for future frames for a planning period, e.g. of a number of seconds, minutes, hours, days, etc. In embodiments, the RAP B radio resources control facility at RAP B may employ an improved radio resource manager B at RAP B to plan, schedule, and control the radio resources of an air interface that may include a multiplicity of physical radio resources RR. In embodiments, some radio resources may be controllable by the RAP B and some radio resources may be opportunistically available to RAP B or to a user u1 ... uPB (e.g. a Wi-Fi or TV Whitespace network that may be connected to network).

In embodiments, the improved radio resource manager B at RAP B may employ a shadow price for QQTS of MMSj among conflicting user set C=C(MMSj)={u1, u2, ... uNC}, such as a set of users, Premium(B)={u1, u2, ... uPB}. In such a conflict set C, the nature of the conflict may be that the required radio resources, RR(MMSj) of a number of users uNC is greater than the radio resources RR(B) at RAP B, which may be expressed as: RR(MMSj)*uNC>RR(B).

In embodiments, a shadow price may be set by water filling, by a Frank Kelly algorithm, by an Improved Frank Kelly algorithm, or by some other value ascription method among conflict set C, expressed simply as IFK(C) without restricting the algorithm to any particular form of shadow pricing algorithm. An ascribed shadow price may be set by an improved radio resource manager on behalf of such a user, such as via Bayesian inference from prior trajectories of such a user. An improved radio resource manager may find a data rate per user that may be differentiated with respect to the value to the service provider operating such a multimedia services network. Such an allocation may be optimal with respect to a value parameter that may be a function of the utilities of the individual users such as, for example, a weighted product, a logarithm, a sigmoidal function or some other function or combination of functions, without restricting the value parameter function to such an example. The mathematics of such an IRRM value setting algorithm may yield an optimum when users' needs are not elastic, such as for guaranteed bit rate (GBR) traffic like a voice conversation. An IRRM may identify opportunities for opportunistic radio resources available at time t for an epoch e RR(t, e) to augment RR at RAP B so as to provide premium services to a larger subset of C than may be scheduled via controllable radio resources alone. That is, the utility function of user u at RAP B need not be continuous, e.g. such as expressed in a number between 0 and 1.0 but may have a discrete form. For example, the value that a user may place on MMSj with a smart phone may not be elastic and may differ from value placed on MMSj when a mobile user is temporarily immobile or is using cable services, such as at home. In addition, an IFK(C) algorithm may limit control traffic to an exchange {221, 222} that may converge via nonlinear inference, e.g. via assignment trajectories of a radio node controller that may employ Hidden Markov Models. An IRRM may converge to a set of utilities per conflicted user, Uj for 1≤j≤NC. Unlike IRRM, a simple water filling and or a simple Frank Kelly algorithm may not reflect the differences in QQTS value per UCX of network access with different applications, with different requirements for guarantee of bit rate, with likelihood of maintaining connection or of losing it, or with smaller or larger physical extent of such a network. For example, a simple water filling or Frank Kelly algorithm may not reflect the differences between a Wi-Fi network with an extent of 30 meters and a cellular network with an extent of 2 kilometers. An IRRM may employ an IFK(C) that may reflect all of these parameters in a resulting shadow price.

Figure 3:
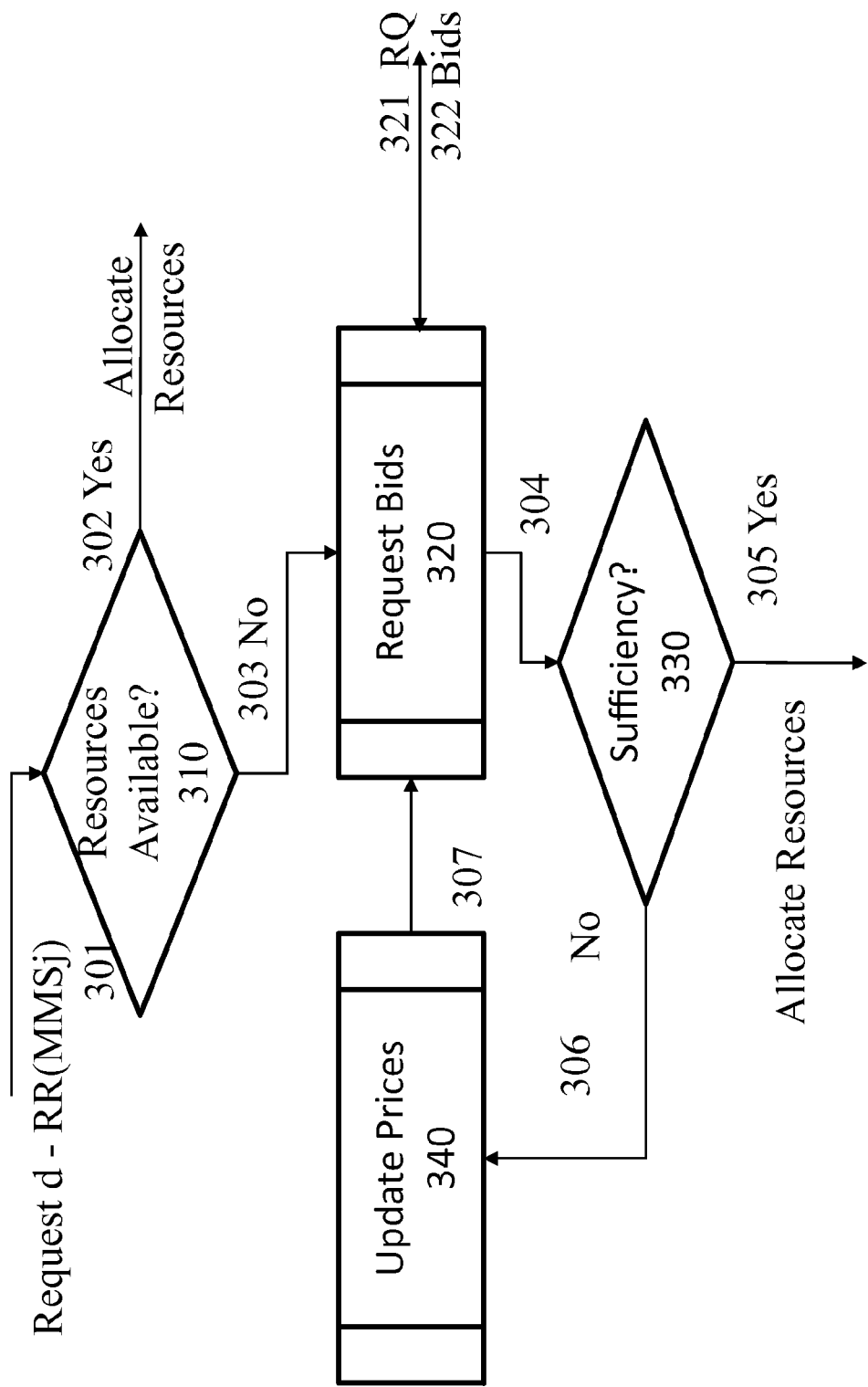
FIG. 3 depicts a workflow of bidding for network resources when system conditions change.

FIG. 3 depicts the logical flow of a management of a shadow price bidding process by a radio resource control point facility 108 interacting with a set of mobile users in a bidding process.

In embodiments, a RAP B improved radio resource manager may receive a stimulus 301 requesting radio resources, e.g. for QQTS via RR(MMSj) for a multimedia service MMSj by a user's device on behalf of a user. In some embodiments, such a request 301 may have been scheduled for a time t that may be within a scheduling epoch, e.g. based on a HMM of a user's trajectory Tu. For example, a user u paying for a short term premium service MMSj, such as renting a movie, at time t may be expected with high probability to request radio resources before a time t+Tmax. A user's mobility trajectory Tu in physical space may ascertain a probability that a RAP B may be required to support such a service at a time t+Tmax. An improved radio resource manager may ascertain at 310 that radio resources RR that may be available. If such resources may be sufficient, then a positive decision at 302 may result in a flow of control out of a shadow pricing logic of FIG. 3 to other logic, e.g. of FIG. 4, FIG. 5, and FIG. 6 of an improved radio resource manager to schedule such resources. If sufficient resources are evaluated at 303 to most likely not be available at a time t-sked that may be a short time in the future, such an improved radio resource manager may initiate a request for bids 320 among potentially conflicted devices D={d1, d2, ... dND} of conflicted users C={u1, u2, uNC}. In embodiments, such a request for bids 320 may include a request RQ at 321 and a set of responses 322 containing bids. In embodiments, the bids in such responses 322 may comprise bids generated by for example the logic of FIG. 2 in one or more devices. A request RQ at 321 may specify a maximum time allowed for initial responses. Such time may be in units of machine time, such as a small number of frames of an air interface. In embodiments, a first improved radio resource manager may respond immediately to an RQ of a second improved radio resource manager with an a priori value assigned to MMSj expressed as a shadow price. In such embodiments, the second improved radio resource manager may rapidly receive bids with the exchange of a small number of bits of control information, RQ, and bids 322. In embodiments, such bids may flow via logical path 304 to an accumulation point 330 at which a determination may be made whether bids received sufficiently deconflict set D for the assignment of radio resources. If the bids received sufficiently deconflict set D for the assignment of radio resources, then control may flow out of the logic of FIG. 3 to other logic of such an improved radio resource manager (e.g. FIGS. 4, 5, and 6) for the allocation of resources via a scheduling process. If a conflict remains, then the improved radio resource manager may transfer control at 306 to a point 340 to update shadow prices. In embodiments, such an update process 340 may employ heuristics to curtail a bidding process {340-320-330}, e.g. via adjustments of weights as a function of characteristics of significance to a multimedia services network regarding users C on trajectories Tu of Cat time t-sked. At some iteration of a bidding process {340-320-330}, sufficient conflicts will have been resolved among D for the allocation of resources at 305 or conditions may have changed sufficiently that heuristics at 340 curtail such a bidding process enabling successful completion of the logic of FIG. 3 at a point 305 according to which resources may be allocated based on shadow prices and heat maps, e.g. via the logic of Bayesian inference of FIG. 6.

Figure 4:
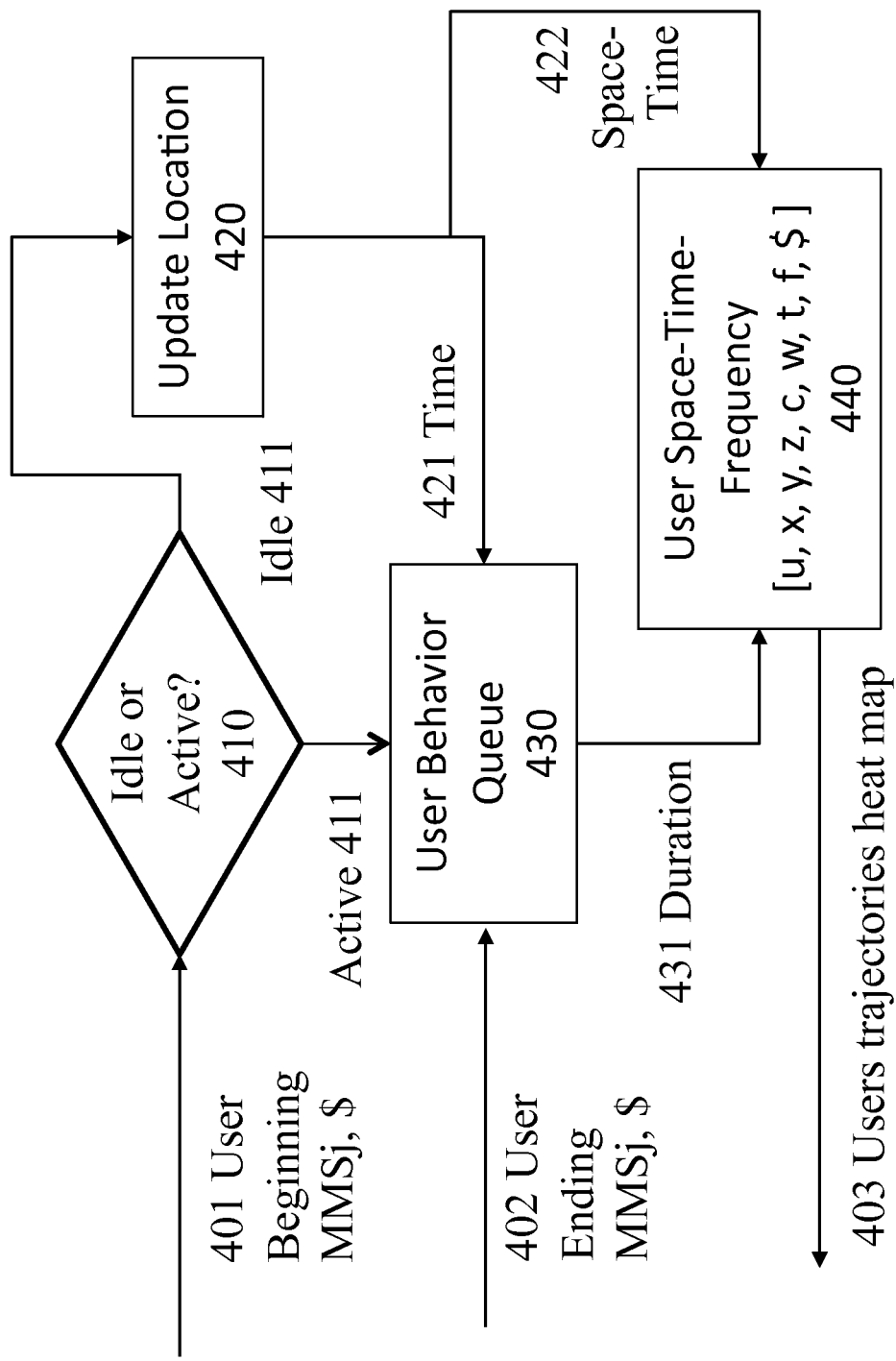
FIG. 4 depicts a workflow of generating a user trajectory heat map.

FIG. 4 shows the logical workflow for generating a user trajectories heat map. Improved parameters generated by a heat map by an improved radio resource manager of a network may quantify user expectations via user behaviors entailing trajectories Tuk per user u with their associated UCX(u), e.g. having a value w in Tuk, e.g. via Hidden Markov Models HMMuk for $1 \leq k \leq NTuk$. QoE may derive from the QQTS of information provided to a user with respect to the expectations of the user. In embodiments, the quantity of information may be accumulated in and the heat map expressed as an array 440 (e.g. [u, x, y, z, c, w, t, f, $]). Such quality of information may be expressed in the user beginning and user ending shadow prices, $, accumulated per user as a function of location and time in the array 440. Timeliness of information, for example, may be proportional to the difference between a time at which a user becomes active at 411 with a MMSj and a time at which a user was last inactive at 412.

In embodiments, a heat map may be generated by counting MMSj $ at 401 obtained from a shadow pricing arrangement of FIGS. 2 and 3, per an element of information e 440. The network may count the user upon the user beginning to access service MMSj 401. Such counts may quantify user behavior and establish user-awareness of a given user by a radio resource control entity for IRRM. Such counts may be the basis for estimates of relative frequency of occurrence, probabilities, and HMMs. A user behavior queue may realize user behavior forensics to instantiate parameters reflective of user expectations. In embodiments, the network may determine that a user has ceased to access a service MMSj 402 and update the user behavior queue 430.

In embodiments, the network may determine whether a user is idle or active 410. If the network determines that the user is active 411, the network may update a user behavior queue 430 according to activity that may be expressed in a parameter UCX(u) having a value w that may be reflective of MMSj, of trajectory Tu, and of other contextual factors as may be computed by such a network. If improved radio resource management logic of FIG. 4 determines that the user is idle 411, then improved radio resource management logic may update a user location 420, and then may update the time associated with the user 421 in the user behavior queue 430, and then may update the space and time information associated with the user 422 in the array 440. After improved radio resource management logic has updated the user behavior queue 430, the user may cease a connection according to an ending signal 402 so the network may update the duration information 431 in the array 440. Once the array 440 has been updated, the improved radio resource management logic may employ users trajectory heat map 403, e.g. in Bayesian inference of FIG. 6.

Figure 6:
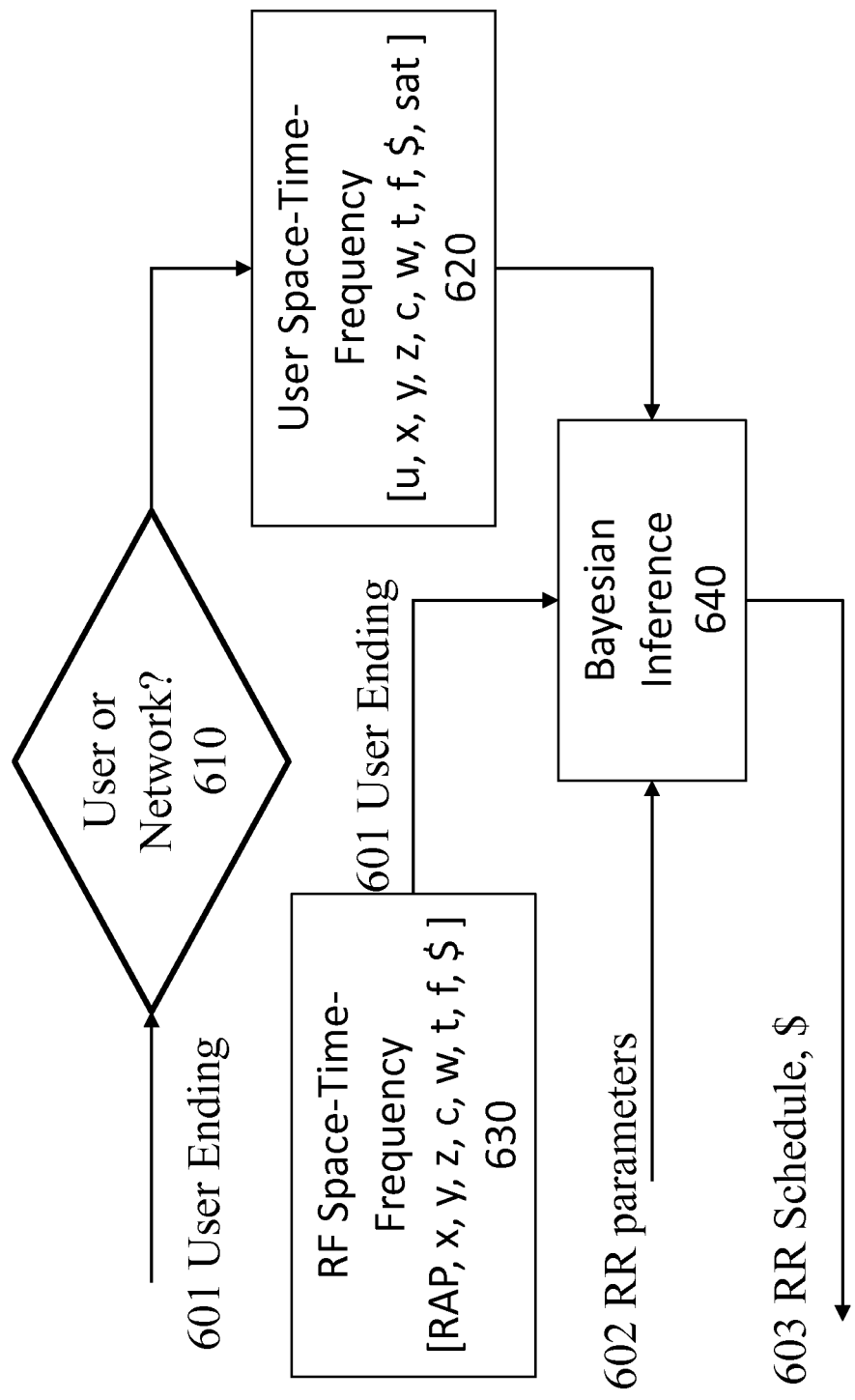
FIG. 6 depicts a workflow of generating an IRRM with Bayesian inference.

A resulting trajectories map 440 may be provided via a flow of control 403 for other uses such as for example to Bayesian inference of FIG. 6 for the optimization of RRIVI schedule at a given wireless node and with respect to a larger radio network and enterprise, such as for example an enterprise of a wireless network operator or of a quad play multimedia service provider. A user trajectories heat map 440 may accumulate per-user usage of quad play (i.e. wireless, voice, video, Internet) services experienced by such a user over space and time. Such a heat map may be nonlinearly collapsed with respect to time in order to generate a space-frequency heat map of user behavior during a given epoch. For example, the heat map may be collapsed in an epoch comprising for example the 24 hours before a major contingency such as a hurricane Katrina or Sandy so that such events do not affect the accuracy of predictions made using the heat map. Additionally, such a heat map may be nonlinearly collapsed with respect to a given user to establish the relative frequency occurrence of connection between a given user and an experiential entity. For example, a heat map may be collapsed to establish the relative frequency occurrence of connection between a given user and another user via a user-to-user voice connection, or via VoIP or IMS; between a given user and media, such as viewing a movie; between a given user and an application, such as playing a game, etc.

In some embodiments, allocation of radio resources to UE based on conventional parameters may not reflect user expectations. Machine learning of user behavior patterns via an array 440 may characterize user expectations in terms of previous statistical patterns 440 termed heat maps expressive of a priori user tendencies.

In embodiments, qualitative heuristics expressed as correlation and weighting rules mapping user states of mobility with space-time-RF usage may express a context UCX to enhance the quality of user behavior modeling with respect to user expectations.

Figure 5:
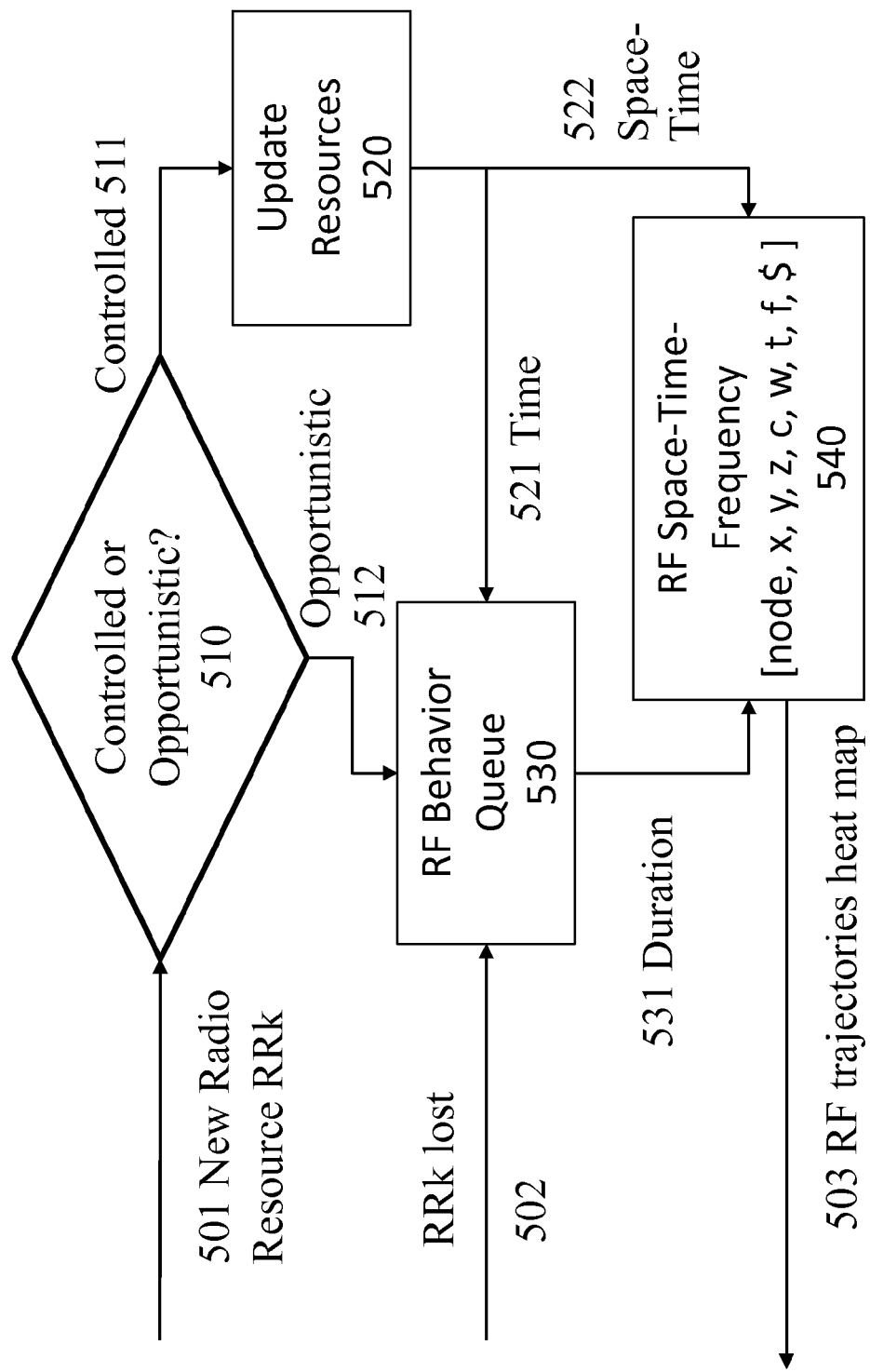
FIG. 5 depicts a workflow of generating a radio resource trajectory heat map.

FIG. 5 depicts a logical flow for generating a radio resource trajectory heat map. In embodiments, improved RF parameters may quantify core and extended radio resources in terms of availability and controllability by an improved radio resource manager. Such radio resources may include controllable and opportunistic radio resources. Controllable radio resources may include core wireless infrastructure bands and modes (e.g. 1XRTT, LTEr9), declining bands-modes (e.g. LTEr8), and emerging bands-modes such as LTEr10, carrier aggregation (CA), cooperative multipoint (CoMP), the advanced wireless system (AWS), and band-mode combinations that may be defined in such improved parameter tables. For example, AWS may comprise an AWS with 1.7 GHz uplink and 2.1 GHz downlink. Opportunistic modes may include bands and modes that may be available to a UE (e.g. Bluetooth, Wi-Fi, ZigBee, Citizens Broadband Service, FirstNet, or TV whitespace devices) that may connect to the Internet. There may be shared spectrum opportunities, e.g. for small cells that may not be directly controlled or completely controllable by a host network employing an improved radio resource manager. The value of alternative space-time-frequency trajectories of radio infrastructure may be quantified via per-application shadow pricing (e.g. for carrier aggregation) in a non-linear bidding process, e.g. according to the logic of FIG. 2 and FIG. 3 that may generate a shadow price (MMSj, $) for a multimedia services MMSj that may in turn contribute to a heat map 440 by which the logic of FIG. 6 may maximize user QoE. In embodiments, and as with the user heat map, the quantity of information may be accumulated in and the radio resource heat map expressed as an array 540 (e.g. [node, x, y, z, c, t, f, $]). Such quality of information may be expressed in the node beginning and node ending shadow prices, $, accumulated per node as a function of location and time in an array 540. Machine learning and autonomic user behavior analytics of heat map 540 may characterize cellular infrastructure coverage and coverage gaps with respect to user expectations to further quantify current and expected return on investment for alternate forms of infrastructure given the mix of capabilities of UE in a service provider's subscriber base.

In embodiments, a radio resources heat map 540 may be generated by counting the radio resources wherein for each additional time epoch t, the successful use of a radio resource, e.g. of a carrier frequency f, may result in a counting of radio resource f proportional to time t at a given node, location, and shadow price 540. The usage count may be updated when a new radio resource RRk is added 501 to or removed from the network 502. In embodiments, the network may determine 510 if the new radio resource RRk is a controlled 511 or opportunistic 512. If the network determines that the new radio resource RRk is controlled 511, the network may update the network resources 520. If the network determines that the new radio resource RRk is not controlled by the network, but rather is available for UE to employ according to permission of the network (e.g. WiFi, TV White Space etc), then such a resource may be treated from a logical perspective as opportunistic 511, according to which such an improved radio resource management logic of FIG. 5 may update an RF behavior queue 530. Additionally, if such a radio resource is removed from the network 502, the improved radio resource management logic may update the RF behavior queue 530.

In embodiments, in response to the network updating the network resources 520, the network may record the time in the RF behavior queue 530 and may update the space and time of an element in the array 540 of a radio resource of frequency f used at a location x, y, z by a user having a UCX w with a shadow price $ as accessed via a node as indicated. In response to an update to the RF behavior queue 530, the improved radio resource management logic of FIG. 5 may update an element in the array 540 with duration information. Once the array 540 has been updated, the improved radio resource management logic may output the RF trajectories heat map 503 for use, e.g. in a Bayesian scheduling logic of FIG. 6.

FIG. 6 depicts a logical flow of an improved radio resource manager with Bayesian inference. Such an improved radio resource manager may incorporate user space-time-frequency satisfaction with MMS and an ascribed or derived shadow price at 620. Such user space-time-frequency satisfaction (sat) with MMS and shadow price may be based, in part, on termination conditions inferred and communicated to a radio resource control point facility 108.

In embodiments, an improved radio resource manager may receive a termination condition 601 regarding a termination of a MMSj, or of a set of MMS for user u, MMSu. In response to receiving such termination information, an improved radio resource manager may determine whether the termination information is associated with a user or a network resource 610. The network may update the user trajectory array 440 by adding a degree of satisfaction, sat of an array 620, upon successful user termination. Alternatively, pre-emptive termination by a user or by a network may be reflected in the array 620 as a degree of likely user dissatisfaction (i.e. as a negative sat of an array 620). RF space-time-frequency patterns of MMS and shadow price at [630] may reflect the historical trajectories and HMM predictions of the state of controllable and opportunistic radio resources [and may be based on a RF trajectories heat map]. Such an improved radio resource manager may track a radio resource (RR) parameter 602 for use by a Bayesian inference facility 640.

In embodiments, a Bayesian inference facility may generate Bayesian inferences 640, i.e. resulting in an RR schedule 603. Such Bayesian inferences may be based on one or more of space-time-frequency-user schedule on shadow pricing, user satisfaction, historical trajectories, and probabilities of associated HMM of the user space-time-frequency array 620 and RF space-time-frequency array 630. Additionally, in some embodiments, the arrays 620 and 630 may be used in full or collapsed forms, in isolation or together. The difference between 630 and the array at 540 is the difference between a "node" and a "RAP." A node may be a RAP (radio access point). However, a node also may be a hard wired network such as an Internet connection point at home, work, or elsewhere. While user behavior map of FIG. 5 comprises behavior with respect to any node serving as an access point to a network, a Bayesian inference facility may schedule radio resources only with respect to radio access points. Hence, RAP heat maps 630 may be a subset of node heat maps 540. Parameters input to the Bayesian inference facility for scheduling may include conventional RR parameters Nue, Backlog[1 . . . Nue], QoS[1 . . . Nue], CQI[1 . . . Nue], UEMode[1 . . . Nue], Nprb, PRB[1 . . . Nprb][1 . . . Nsfr], Na, ANT[1 . . . Na] and UEant[1 . . . Nue], UCX w, shadow price $, and novel RR parameters of an improved radio resource manager such as likelihood of frequency f being available having a capacity to support MMSj within scheduling epochs that may be derived, i.e. from a radio resource heat map 630 that may be a subset of a network resources heat map 540. In embodiments, improved parameters may include the user space-time-frequency heat map [u, x, y, z, c, t, f, $, sat] 620 and an RF space-time-frequency heat map [RAP, x, y, z, c, t, f, $] 630. In embodiments, the Bayesian inference facility may analyze the user space-time-frequency heat map 620 and the RF space-time-frequency (RR) heat map 630 with conventional RR parameters 602 deriving novel RR parameters from RR heat map 630 to generate an improved schedule of radio resources 603 via Bayesian inference for use by a RAP's RF hardware.

For example, suppose a count for an RF or user trajectory, Ta is 10, a count for Tb is 80 and a count for Tx is 110. Since 200 events have been counted, one may ascribe a probability of future behavior according to the relative frequency occurrence of previous behavior. The relative frequency of occurrence of Ta has been 10/200=5%. The relative frequency of occurrence of Tb has been 80/200=40%. The relative frequency of occurrence of Tx has been 110/200=55%. The improved radio resource manager may employ such historical patterns of RF and user behavior to predict future behavior so that radio resources may be scheduled for a user on a radio frequency employing radio resources for MMSj without delay, thus improving the throughput of a multimedia network with respect to each mobile user of a group of such users, having successfully resolved conflicts via shadow pricing apparatus and with Bayesian inference enabled via arrays of historical user experience and RF availability.

A Bayesian inference facility 640 may optimally allocate and schedule radio resources simultaneously in space, time, and frequency to maximize aggregate user quality of experience reflected in a shadow price within the constraints of maximizing aggregate service provider revenue expectations from radio resources providing IRRM. Quantitative statistics including Bayesian inference may optimize RRM with respect to most likely user expectations (i.e. represented by the user space-time-frequency heat map 620) with constraints of radio network parameters (i.e. represented by the RF space-time-frequency heat map 630). The benefits of quantification of user expectations, shadow pricing per-application per-user and per use context UCX via related Bayesian resource allocation may provide enhanced QoE for enhanced user loyalty to the service provider.

While only a few embodiments of the present invention have been shown and described, it will be obvious to those skilled in the art that many changes and modifications may be made thereunto without departing from the spirit and scope of the present invention as described in the following claims. All patent applications and patents, both foreign and domestic, and all other publications referenced herein are incorporated herein in their entireties to the full extent permitted by law.

The methods and systems described herein may be deployed in part or in whole through a machine that executes computer software, program codes, and/or instructions on a processor. The present invention may be implemented as a method on the machine, as a system or apparatus as part of or in relation to the machine, or as a computer program product embodied in a computer readable medium executing on one or more of the machines. In embodiments, the processor may be part of an ASIC, FPGA, server, cloud server, client, network infrastructure, mobile computing platform, stationary computing platform, or other computing platform. A processor may be any kind of computational or processing device capable of performing information processing, executing program instructions, codes, binary instructions and the like. The processor may be or may include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes or may have no threads, programs, or codes. Any such threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor, or any machine utilizing one, may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server, cloud server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures.

The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements. The methods and systems described herein may be adapted for use with any kind of private, community, or hybrid cloud computing network or cloud computing environment, including those which involve features of software as a service (SaaS), platform as a service (PaaS), and/or infrastructure as a service (IaaS).

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, methods described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiment, method, and examples, but by all embodiments and methods within the scope and spirit of the disclosure.

All documents referenced herein are hereby incorporated by reference.

What is claimed is:

1. A system for allocating and scheduling radio resources simultaneously, based on a user context, comprising:
    a radio resource control point facility associated with a network, enabled to:
        track a location of a user device that is connected with the network,
        track content of transmissions via the network to and from the user device,
        mediate a process of ascribing value to a requested resource based on a bid from the user device,
        generate a heat map of trajectories for the network, and
        schedule network resources based on value ascription, user context, the heat map, and a Bayesian inference.

2. The system of claim 1, wherein the user device comprises a mobile user device.

3. The system of claim 1, wherein tracking the content of transmissions comprises tracking the content of transmissions via a packet sniffer executing on the radio resource control point facility.

4. The system of claim 1, wherein the heat map of trajectories comprises one of a heat map of user device trajectories and a heat map of radio resource trajectories.

5. The system of claim 1, wherein the heat map of trajectories is a plurality of heat maps of trajectories.

6. The system of claim 1, wherein the network is one of a wireless network, a wired network, and both a wireless and wired network.

7. A method for allocating and scheduling radio resources simultaneously, based on a user context, comprising:
    providing a radio resource control point facility associated with a network;
    tracking a location of a user device that is connected with the network;
    tracking content of transmissions via the network to and from the user device;
    mediating a process for ascribing value to a requested resource based on information from the user device;
    generating a heat map of trajectories for the network; and
    scheduling network resources based on the value ascription, the heat map, and a Bayesian inference.

8. The method of claim 7, wherein the user device comprises a mobile user device.

9. The method of claim 7, wherein tracking the content of transmissions comprises tracking the content of transmissions via a packet sniffer executing on the radio resource control point facility.

10. The method of claim 7, wherein the heat map of trajectories comprises one of a heat map of user device trajectories and a heat map of radio resource trajectories.

11. The method of claim 7, wherein the heat map of trajectories is a plurality of heat maps of trajectories.

12. The method of claim 7, wherein the network is one of a wireless network, a wired network, and both a wireless and wired network.

13. A non-transitory computer-readable medium that stores instructions, that, when executed by a processor, cause the processor to perform a method for allocating and scheduling radio resources simultaneously, based on a user context, the method comprising:
    providing a radio resource control point facility associated with a network;
    tracking a location of a user device that is connected with the network;
    tracking content of transmissions via the network to and from the user device;
    mediating a process for ascribing value to a requested resource based on information from the user device;
    generating a heat map of trajectories for the network; and
    scheduling network resources based on the value ascription, the heat map, and a Bayesian inference.

14. The non-transitory computer-readable medium of claim 13, wherein the user device comprises a mobile user device.

15. The non-transitory computer-readable medium of claim 13, wherein tracking the content of transmissions comprises tracking the content of transmissions via a packet sniffer executing on the radio resource control point facility.

16. The non-transitory computer-readable medium of claim 13, wherein the heat map of trajectories comprises one of a heat map of user device trajectories and a heat map of radio resource trajectories.

17. The non-transitory computer-readable medium of claim 13, wherein the heat map of trajectories is a plurality of heat maps of trajectories.

18. The non-transitory computer-readable medium of claim 13, wherein the network is one of a wireless network, a wired network, and both a wireless and wired network.

* * * * *